(12) United States Patent
Krein

(10) Patent No.: US 7,945,413 B2
(45) Date of Patent: May 17, 2011

(54) VOLTAGE-SENSED SYSTEM AND METHOD FOR ANTI-ISLANDING PROTECTION OF GRID-CONNECTED INVERTERS

(75) Inventor: Philip T. Krein, Champaign, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 411 days.

(21) Appl. No.: 11/849,827

(22) Filed: Sep. 4, 2007

(65) Prior Publication Data

US 2009/0059631 A1 Mar. 5, 2009

(51) Int. Cl.
*G06F 13/20* (2006.01)
(52) U.S. Cl. .......................................... 702/111; 702/109
(58) Field of Classification Search .................... 307/16, 307/32, 36, 38, 43, 64, 44–46, 125, 127, 307/129; 702/57, 64, 75, 60, 111, 108, 109; 363/55, 56.01, 57, 60, 48
See application file for complete search history.

(56) References Cited

U.S. PATENT DOCUMENTS

| | | | |
|---|---|---|---|
| 6,172,998 B1 | 1/2001 | Horie et al. | |
| 6,489,755 B1 | 12/2002 | Boudreaux, Jr. et al. | |
| 6,801,442 B2 * | 10/2004 | Suzui et al. | 363/55 |
| 6,853,940 B2 * | 2/2005 | Tuladhar | 702/111 |
| 7,138,728 B2 * | 11/2006 | LeRow et al. | 307/30 |
| 7,289,341 B2 | 10/2007 | Hesterman | |
| 7,339,287 B2 | 3/2008 | Jepsen et al. | |
| 2003/0080741 A1 * | 5/2003 | LeRow et al. | 324/320 |
| 2009/0296348 A1 | 12/2009 | Russell et al. | |

OTHER PUBLICATIONS

Bower et al., "Evaluation of Islanding Detection Methods for Utility-Interactive Inverters in Photovoltaic Systems," Photovoltaic Systems Research and Development, Sandia National Laboratories, Albuquerque, NM, Technical Report No. SAND2002-3591, Nov. 2002.
Beom et al., "An Improved Method for Anti-Islanding by Reactive Power Control," in Proceedings, IEEE Eighth International Conference of Electrical Machines and Systems, Nanjing, China, 2005, vol. 2, pp. 965-970—(Best Copy Available).
Kobayashi, et al., "Method for Preventing Islanding Penomenon on a Utility Grid with a Number of Small Scale PV Systems," in Record, IEEE Photovoltaic Specialists Conference, Las Vegas, NV, 1991, vol. 1, pp. 695-700.
Kobayashi, et al., "Statistical Evaluation of Optimum Islanding Preventing Method for Utility Interactive Small Scale Dispersed PV System," in Record, IEEE Photovoltaic Specialists Conference, Waikoloa, HI, 1994, vol. 1, pp. 1085-1088.
Noor, et al., "Unintentional Islanding and Comparison of Prevention Techniques," Proceedings, IEEE North America Power Symposium, Ames, IA, 2005, pp. 90-96.
International Preliminary Report for International Patent Application No. PCT/US2008/075178, Mar. 18, 2010, 6 pgs.
International Search Report for International Patent Application No. PCT/US2008/075178, Nov. 6, 2008, 8 pgs.

* cited by examiner

*Primary Examiner* — Rajnikant B Patel
(74) *Attorney, Agent, or Firm* — Barnes & Thornburg LLP

(57) ABSTRACT

A method is provided for preventing islanding of a power source connected to an electric AC grid via an interface. The method senses an output voltage waveform of the interface, controls an output current waveform of the interface to track a reference current waveform having a mathematical relationship with the sensed output voltage waveform, and discontinues the output current waveform when the output voltage waveform is sensed to be outside a predetermined waveform range.

19 Claims, 4 Drawing Sheets

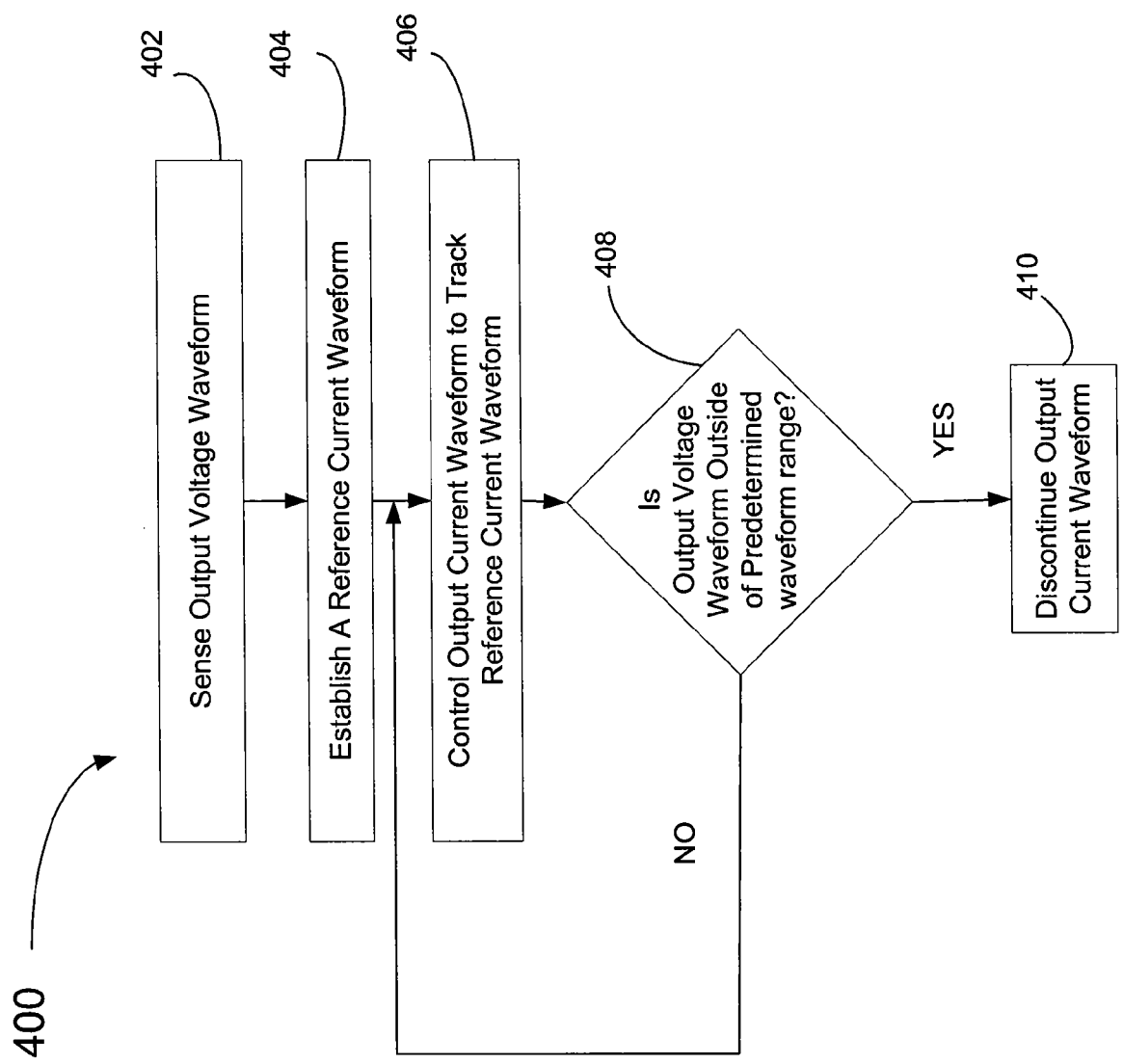

VOLTAGE-SENSED SYSTEM AND METHOD FOR ANTI-ISLANDING PROTECTION OF GRID-CONNECTED INVERTERS

FIELD

The invention relates, generally, to grid-connected power generating systems and, more particularly, to systems and methods for preventing islanding of grid-connected inverters.

BACKGROUND

An electric utility grid generally has many independent energy sources energizing the grid and providing power to the loads on the grid. This distributed power generation has become increasingly common throughout the world as alternative energy sources are being used for the generation of electric power. In the United States, the deregulation of electric companies has spurred the growth of independent and alternative energy sources co-existing with the electric utility. Rather than have dedicated energy sources for a particular load, these alternative energy sources can tie into the grid and are used to supplement the capacity of the electric utility.

This growth of alternative energy resources has offered large opportunities for innovation and market development in the hardware and infrastructure components that support these alternative resources. Many alternative resources connect to the grid through power electronic inverters and converters. Inverters or other types of power converters are configured to convert direct current (DC) power taken from many types of alternative energy sources into alternative current (AC) power suitable for connection to the electric utility grid. Other examples include direct DC power from fuel cells or solar cells, or rectified power from micro-turbines or small wind power devices.

Two basic architectures for interconnection to the electric grid, corresponding to AC and DC sources are possible. In a "DC-side" system, the alternative energy resources are interconnected at their terminals to form a single large DC source. A single large inverter performs the power conditioning and grid interconnection process of the single DC source. In an "AC-side" system, each resource has its own power converter, and interconnection to the electric grid takes place either within the electric grid or at a conventional AC transformer that interfaces to the grid. Combinations of these two systems are possible, in which DC-side connections build the source power up to a desired level, while multiple AC-side connections act together to form a large effective grid source. Most present photovoltaic installations use DC-side connections because of control complexities and high costs associated with inverters. Low-cost modular power converters are required for implementation of AC-side connections.

At least three major challenges arise in trying to develop power converters suitable for grid connection. A first challenge is basic cost. Conventional power converter designs impose costly control and filtering requirements. There is much promise in unconventional designs, which scale to a wide range of power levels. A second challenge is expandability. A parallel interconnection of multiple units as power sources can give rise to control issues. As such, individual power converters need to support this form of interconnection without creating control problems. A third challenge is to meet requirements of codes and standards for alternative energy resource connection to the grid, which are documented in the Institute of Electrical and Electronic Engineers, Inc (IEEE) Standard 1547™ and Underwriters Laboratory (UL) Standard 1741, which are directed to standards for interconnecting distributed resources with electric power systems. This third challenge is a topic of current global research. Many known approaches tend to add considerable complexity and cost to the power converter. A major requirement for grid-connected power converters imposed by IEEE Standards 1547 and UL Standard 1741 is "anti-islanding" protection. When the grid connection is lost or otherwise stops functioning, the photovoltaic power converter is required to shut off to avoid "back-feed" into the corresponding local distribution network. This is an important safety issue so repair personnel and others can be assured that there will not be unexpected sources of power on lines thought to be de-energized. There are also important operational considerations such as voltage and phase synchronization when attempting to re-connect an islanded portion of the utility grid.

Generally, techniques or methods used to detect islanding conditions at the individual power converter fall in one of two categories, passive and active. Passive methods typically monitor waveform parameters and disable output power if these waveform parameters sufficiently deviate from specified conditions. In this configuration, the method is strictly an observer. Active methods for detecting islanding conditions typically introduce deliberate changes or disturbances into the grid, then monitor the system response. Thus, active techniques are generally described as "perturb and observe" control processes.

Typically, phase-locked loops or similar methods are used to synchronize the output power of the power interface with the grid. As such, the current injected into the grid is made to the desired grid operation, not the actual grid operation. The issues associated with synchronization are well understood and require additional control processes for startup and transient operations.

Therefore, a need exists for a power converter that provides anti-islanding protection and overcomes the problems noted above and others previously experienced for addressing issues of cost, expandability, regulation and connectability. These and other needs will become apparent to those of skill in the art after reading the present specification.

SUMMARY

The foregoing problems are solved and a technical advance is achieved by the present invention. Articles of manufacture and systems consistent with the present invention provide a power converter that provides anti-islanding protection.

A method is provided for preventing islanding of a power source connected to an electric AC grid via an interface. The method senses an output voltage waveform of the interface, controls an output current waveform of the interface to track a reference current waveform having a mathematical relationship with the sensed output voltage waveform. The method then discontinues the output current waveform when the output voltage waveform is sensed to be outside a predetermined waveform range.

In one aspect of the invention, the method discontinues the output current waveform when the output voltage waveform is sensed to be outside of the predetermined waveform range for a predetermined number of line cycles of operation. In another aspect, the sensing of the output voltage waveform comprises sensing the frequency of the output voltage waveform, and responding when the frequency deviates outside of the predetermined range for the intended nominal line frequency.

In the invention, the output current waveform is related to the sensed output voltage waveform by a mathematical function. This mathematical function may be a linear, nonlinear, and/or non-invertible function of the sensed voltage waveform. This mathematical function can include a time delay, and/or benefit from a small time variation.

In an advantageous aspect of the invention, a system is provided for preventing islanding of a power source connected to an AC electric grid. The system comprises an interface connectable between the power source and the electric grid, a sensor for sensing the output voltage waveform of the interface, a control unit for controlling an output current waveform of the interface to track a reference current waveform having a correlation with the sensed output voltage waveform, and a mechanism for discontinuing the output current waveform when the output voltage waveform is sensed to be outside a predetermined waveform range.

In an advantageous aspect of the invention, a digital implementation of the control is also possible, either in the form of additions to the power interface control software or as part of a complete digital hardware system.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 4 is a flow chart illustrating a method for preventing islanding of the grid-connected controlled current source consistent with the present invention.

DETAILED DESCRIPTION OF THE DRAWINGS

Reference will now be made in detail to an implementation consistent with the present invention as illustrated in the accompanying drawings. Wherever possible, the same reference numbers will be used throughout the drawings and the following description to refer to the same or like parts.

Figure 1:
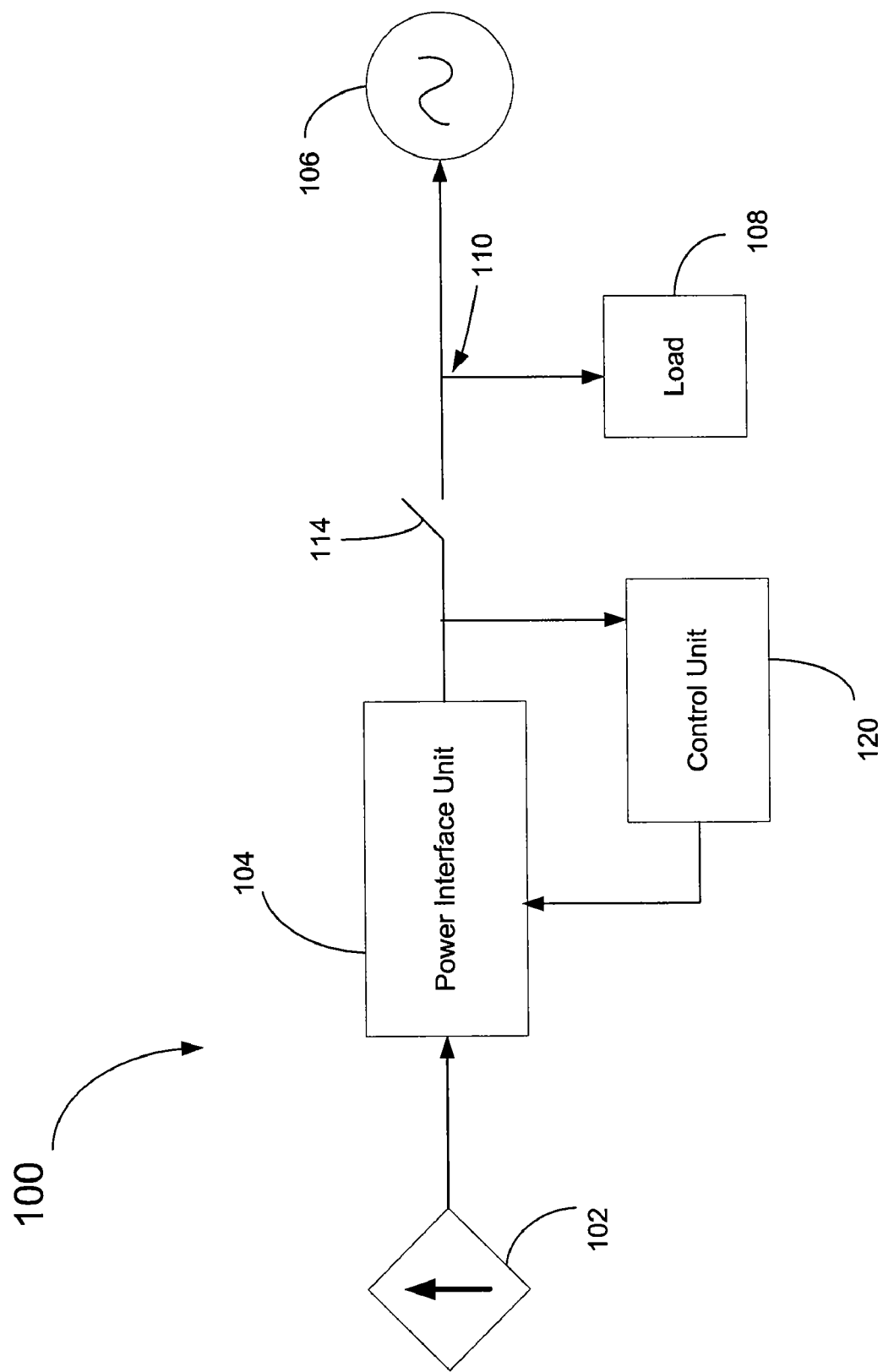
FIG. 1 is a schematic diagram illustrating one embodiment of a power source connected to an electric AC grid via an interface consistent with the present invention.

FIG. 1 depicts one embodiment of a grid-connected power system 100, which includes an energy source unit 102 and a power interface unit 104 which are connected to a utility grid 106. A feedback control unit 120 is connected to the grid 106 and the power interface unit 104, which is configured to provide power to the grid 106. A load 108, which may or may not be present, is connected to the interface unit 104 and the utility grid 106 at node 110. Alternately, the load 108 may be a plurality of loads. As required for regulatory compliance, a switch 114 may be positioned between the interface unit 104 and the utility grid 106 and load 108 (if present). Alternately, other protection devices may also be present therebetween. The source unit 102 may be any kind of power or energy generating system, such as for example a solar panel, solar cell, fuel cell, wind generator, rotary generator, etc. A control integral to the power interface 104 can draw maximum available power whenever power is available and useful. The control acts to maintain operation at an optimum power point, selected for the specific energy source technology. The interface unit 104 may be a switching power converter, a power inverter and the like, and may include an energy storage unit (not shown). The switch 114 may be a solid-state switching device, an electromechanical switching device, and the like.

The feedback control unit 120, configured to control an output current or current waveform of the power interface unit 104, receives input corresponding to a voltage or voltage waveform sensed at the output terminals of the power interface unit 104. Once received, the control unit 120 utilizes the sensed voltage input to control an output current of the power interface unit 104. Alternately, the control unit 120 may be integral to the power interface unit 104.

An island event occurs when the load 108 remains energized when the utility grid 106 becomes de-energized. In general, the occurrence of an island represents an undesirable operation of the system. The power interface unit 104 needs to be configured to sense the occurrence of an island condition, as required by regulatory requirements, and to cease injecting power into the grid 106 and load (if present). Switch device 114, if present, may be opened as a further step.

This controlled current method is effectively a passive approach—power interface action is governed by a direct measurement at the voltage terminals. In this controlled current method, the control unit 120 senses the voltage that is imposed by the grid on the output terminals and drives the output current of the power interface unit 104 wherein the output current is made to follow a reference or command current generated by the control unit 104. In addition, an undesirable change in the sensed output voltage of the power interface unit 104 is interpreted as an islanded condition which causes the control unit 120 to discontinue the current output from the power interface unit 104.

In the power interface unit 104, the reference current needs to be related to the actual electric grid voltage. For example, if the grid operates with a sinusoidal voltage at 60 Hz, the reference current should also be a sinusoid at 60 Hz. There is still debate on whether power converters should follow the grid voltage if it contains modest levels of distortion, but by regulatory standard, voltage distortion needs to be low.

This controlled current method is based entirely on terminal voltage sensing to detect whether or not the power interface unit 104 is connected to the power grid 106. If the grid connection is lost, this condition is detected and the power interface unit 104 shuts down to meet requirements of anti-islanding protection. A key attribute is that the power interface unit 104 is configured to control its output current. This output current is controlled via the power electronics switching action to track a time-varying reference current. This output current, which under normal operating conditions is approximately sinusoidal, is fed into the connected electric power grid 106.

When the grid is connected, the output voltage of the power interface unit 104 is imposed by the electric grid 106, and will be a sinusoidal voltage with low or minimal distortion. As such, the output current delivered by the power interface unit 104 is also sinusoidal. If the grid connection is lost, the control unit 120 interacts with the power interface unit 104 in such a manner as to alter the power interface output voltage away from its sinusoidal operating condition. The resulting changes in the sensed voltage are detected and based on regulatory standards the power interface unit 104 shuts off by setting its output current to zero. The method automatically resets a period of time after the grid 106 is reconnected, once a sinusoidal voltage, imposed by the reconnected grid 106, is sensed at the output terminals of the power interface unit 104.

The electric grid 106, operating normally at 50 Hz or 60 Hz (the mains frequency), provides a sinusoidal voltage with low distortion. The method is not limited to these applications, and can be used for other frequencies or even pre-determined non-sinusoidal grid waveforms. The reference current magnitude and phase are set under normal conditions such that the mains frequency part of the current delivers a desired power and reactive power flow from the power interface unit 104 into the grid 106. Adjustment of the magnitude and phase to accomplish control of power and reactive power is well known and is separate from this invention.

Figure 2:
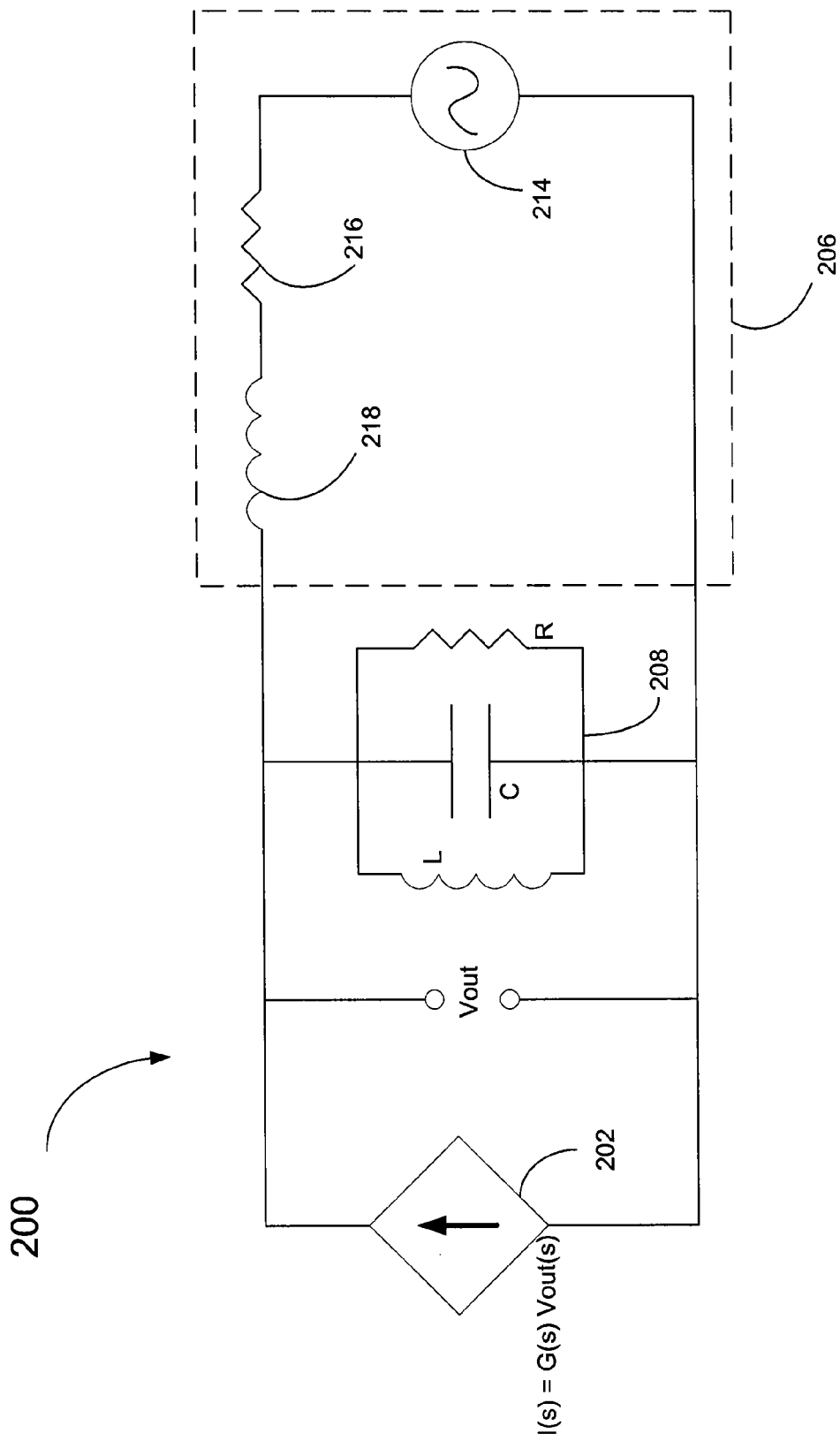
FIG. 2 is a schematic diagram illustrating an equivalent circuit of a current source connected to a load and to an electric grid consistent with the present invention.

Now referring to FIG. 2, an embodiment of an equivalent circuit 200 comprising a combination of the energy source 102 and interface unit 104 of FIG. 1, hereafter referred to as a current-controlled interface unit 202, connected to an electric grid 206 is shown. The electric grid 206 is represented by a voltage source Vgrid 214, a grid resistance Rgrid 216 and a grid inductance Lgrid 218. The interface unit 202 delivers a controlled output current I(t) to the grid 206, where the voltage output Vout (t) of the power interface unit 202 is sensed or measured. The controlled output current I(t) can be represented by the following equation:

$$I(s) = G(s) V_{out}(s) \quad \text{Equation 1}$$

where the controlled output current I(s) is a Laplace transform of the controlled output current and represented with Laplace transforms of the product of G(s) and $V_{out}(s)$, where $V_{out}(s)$ is the Laplace transform of the sensed output voltage $V_{out}(s)$ and G(s) is a Laplace transformed function that represents a differential equation or other mathematical relationship. Here G(s) represents the desired functional relationship between the voltage and current. It is well known to one skilled in the art that the actual output current of the power interface unit is subtly different than the desired reference current in Equation 1 due to the transfer function representing the power electronics process internal to the power interface unit 104 in FIG. 1.

The operation of FIG. 2 can be described as follows. Initially, the grid connection is present, but the interface output current is zero. The load 208, shown as the parallel R-L-C test circuit specified by UL 1741, is supplied power from the grid 206. The control process of the control unit 120, shown in FIG. 1, is initiated, since the detected grid voltage is nonzero, and the output current of the power interface units begins to track the reference current which takes the value G(s) $V_{out}(s)$. Any power difference or mismatch between the power interface output power and the load power demand, the power mismatch, is either absorbed or supplied by the grid 206. In the event that real power and reactive power mismatches are effectively zero, the gain on G(s) is such that the power interface output current I(s) closely matches a current supplied to the load 208 and the grid current $I_{grid}$ is essentially zero. In this case, for a load impedance Z(s), grid voltage $V_{grid}(s)$, converter output voltage V(s), load current $I_{load}(S)$, and grid current $I_{grid}(s)$, the relationships are:

$$I_{load}(s) = V(s)/Z(s), \quad \text{Equation 2}$$

$$I_{grid}(s) = [V_g(s) - V(S)]/Z_{grid}(s), \quad \text{Equation 3}$$

$$I(s) = I_{load}(s) - I_{grid}(s). \quad \text{Equation 4}$$

It can be shown that when the electric grid 206 is connected (and therefore we expect a low grid impedance such that $Z_{grid} \ll Z$), the voltage V(s) can be nearly identical to $V_{grid}(s)$.

To make the voltages identical, the required relationship is G(s)Z(s)=1, which is not a suitable configuration objective. If the grid connection is lost, the effect is that of a high value of $Z_{grid}(s)$ present on the output of the power interface. As such, the only allowed solutions in this case are either V(s)=0 or G(s)Z(s)=1.

Accordingly, it is only necessary to ensure that the product G(s)Z(s) is never exactly one. If this holds, then grid connection will impose a minimal current mismatch. The grid disconnection can lead only to a solution with V(s)=0, which is the desired anti-islanding behavior since it effectively shuts off output power. The condition G(s)Z(s)=1 is equivalent to G(s)=$Z^{-1}(s)$. In a real system, it is actually quite straightforward to ensure a non-invertible condition, that is, $$G(s) \neq Z^{-1}(s) \quad \text{Equation 5}$$

To see this, consider a form of G(s) that includes a time delay. The only way for G(s) to match $Z^{-1}(s)$ in this situation is for Z(s) to involve a time advance. This is not causal behavior, and would not be plausible for a realistic system. Thus, it is not difficult to prevent the condition G(s)Z(s)=1 from occurring, either by enforcing a time delay within G(s) or by imposing a small time variation on G(s) such that the condition is not met over any substantial time interval. In either case, loss of the grid can be detected quickly. These techniques can minimize any non-detection zone and mean that loss of the grid is detected provided only that the loss of grid has sufficiently high impedance. Tests of the method have shown that "sufficiently high" means more than a few ohms, a level that covers almost any plausible loss of connection scenario.

Figure 3:
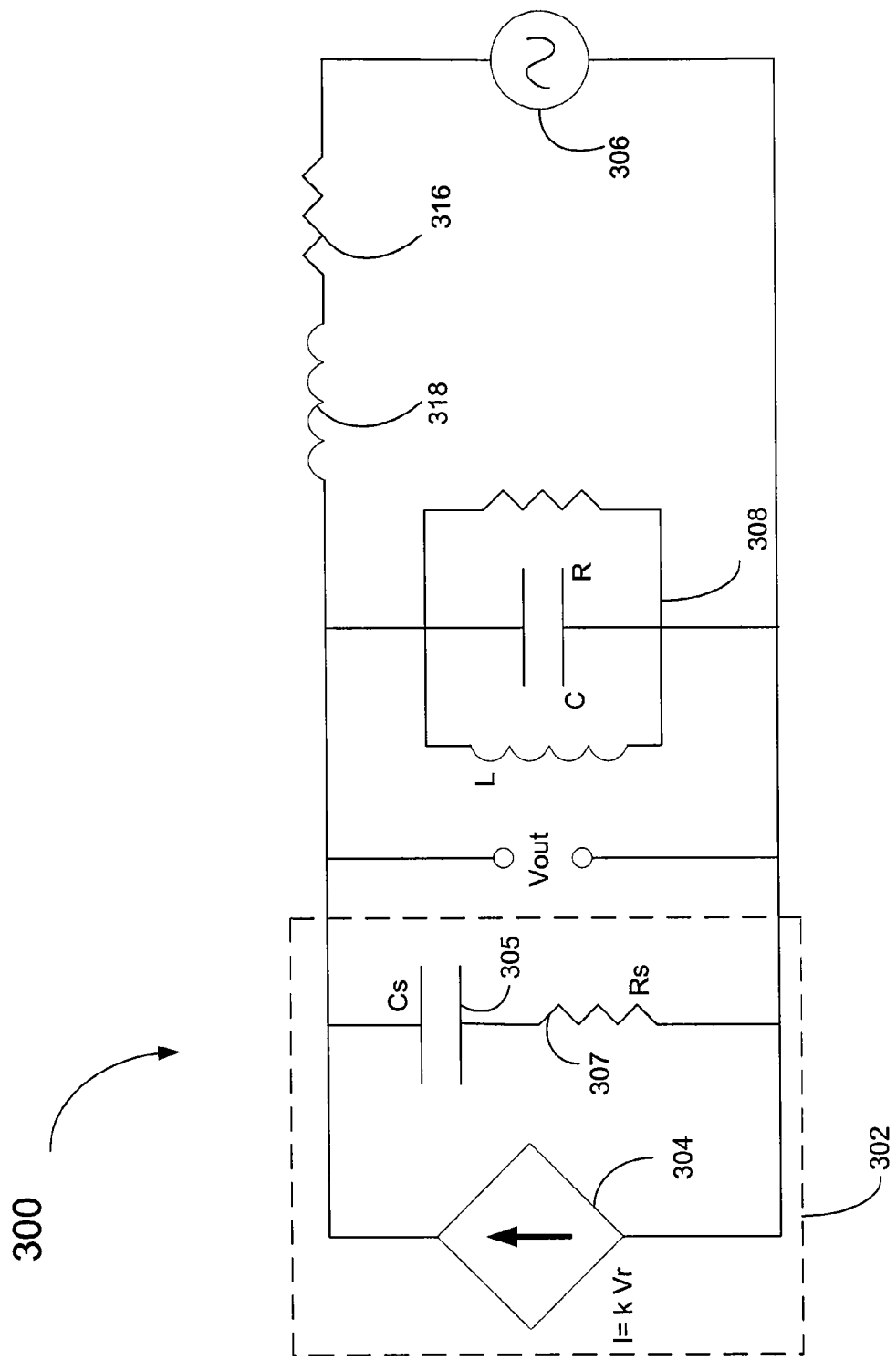
FIG. 3 is a schematic diagram illustrating another equivalent circuit of a current source connected to a load and to an electric grid consistent with the present invention.

Now referring to FIG. 3, an embodiment illustrating an equivalent circuit 300 of the circuit 200 of FIG. 2 is shown. This equivalent circuit 300 includes a sensing network comprised of a capacitor $C_s$ 305 and a resistor $R_s$ 307 connected in series to form an RC filter used to create the output reference current. As shown, the position of the sense capacitor $C_s$ 305 relative to the resistor 307 is selected to provide a high-pass characteristic. Further, the controlled output current I(t) is selected to be proportional to the sense resistor voltage $V_r(t)$, with the proportional gain k determined so as to provide the desired output current magnitude. The gain k may be adjusted by a maximum power point tracking process.

Now referring to FIG. 4, a flow chart 400 illustrating a method for preventing islanding of the grid-connected controlled current source unit 202 of FIG. 2 is shown. This method begins at step 402 where the system establishes a predetermined current. The method then proceeds to step 404, where the output current of the power interface is made to track the predetermined current. At step 406, an output voltage is sensed. The method then proceeds to step 408 to determine whether the sensed output voltage is outside a predetermined voltage or waveform range. In the affirmative, the power delivered from the interface unit 202 is interrupted or disconnected from the grid 206. Otherwise, the method returns to step 406. In case where the power delivery was interrupted, the power delivery can be resumed shortly, after a few line cycles or seconds of operation as determined by appropriate regulatory requirements, after the grid is reconnected and a sinusoidal voltage is re-imposed at the terminals of the interface unit 202.

The provided method relies on either stable or unstable voltage behavior when the grid connection is lost. In this case, the current reference is derived directly from the output voltage of the interface unit 202, and the following are all possible scenarios:

The output current is a signal i(t) that is proportional to the measured output of the power interface unit 202.

The output current is a signal that is proportional to the output of a simple filter circuit (such as an RC or CR voltage divider) connected to the output voltage of the power interface 202.

The output current is proportional to the output of a differential equation in which the output voltage of the power interface unit 202 serves as the input. The differential equation is selected as any equation which will be sinusoidal at fixed frequency if and only if the output voltage is an externally imposed sinusoid.

The output current is proportional to a function of the measured output voltage of the power interface unit 202 that includes a term proportional to the time derivative of output voltage.

The output current can be represented with Laplace Transforms as the product $I_{ref}(s)=G(s)V(s)$.

Any of these scenarios may also have an intentional added time delay to provide the correct causality properties to enforce the non-invertible condition in Equation 5. In all approaches for the generation of the output current, the selected proportion or gain is chosen such that the actual current will result in delivery of the desired output power. A phase lag or lead can be added to provide control over reactive power as well. The principle of choosing the specific form of the reference is that a loss of connection to the grid 206 means that over time, the output voltage will change from its initial grid-based value. The simplest form of change is to the voltage magnitude, but the frequency will also change.

The choice of function and operation under the provided method is intended to produce a particular type of operation. Two alternatives are possible:

1. The function is chosen to make the operation stable at the instantaneous current value i(t)=0. In this case, when the external grid connection is removed, the method can actively drive the controlled current i(t) to zero over time as the only possible stable condition. This effectively discontinues power flow.
2. The function is chosen to make the operation unstable when the external source is not connected. In this case, when the grid connection is lost, the voltage will immediately start to grow or change rapidly—conditions that are easily detected by conventional methods which can take action to turn off the power converter.

In any event, a sensing circuit determines whether or not the output voltage is within pre-determined limits (for example, within ±20% of the nominal value or as specified in the relevant performance standards). If the voltage is outside these limits for more than about three to four line cycles, or the time specified by the relevant performance standards, the circuit will shut off by setting the reference current to zero. It is also possible to monitor the output frequency and shut off the power interface unit 202 if the measured frequency deviates from the performance standards. Both voltage and frequency sensing methods can be combined to make the arrangement robust.

The advantages of the invention are that no synchronization to the mains is required, nor in most implementations is a precise clock needed. The current magnitude and phase can be set to deliver the desired real and reactive powers without significant effect on the grid connection detection process. When the current is made proportional to a function of the detected voltage, the arrangement is passive and self-contained, and therefore well-suited to modular converters. Unlike conventional active methods that react to frequency tuning or other complicated signal processing, the provide method relies on a simple derivation from the power converter terminal voltage and can detect loss of grid connection without additional external information.

Even when large groups of power converters that rely on this method are interconnected, the method detects loss of grid when it occurs. An additional advantage is speed. In most cases, loss of grid can be detected within one AC cycle after it occurs. Even under worst-case conditions detection is successful within the requirements of present standards that call for anti-islanding operation within 1-2 seconds.

The function G(s) in FIG. 2 is not arbitrary: it must be selected to ensure that the combined system with grid disconnected will yield either stable or unstable action (i.e. not marginally stable, which could result in a sustained resonance that may be undetectable). The "stability" or "instability" must be rapid enough to ensure unambiguous detection in well under two seconds. This is, however, straightforward. A high-pass filter with an added time delay of a few microseconds appears to be extremely robust in this context. Notice that the form of G(s) is predetermined, but an additional gain can be used that adjusts in accordance with the available energy to deliver a desired average power to the grid according to the relationship:

$$I_{ref}(s)=k\, G(s)V(s) \quad\quad\quad \text{Equation 6}$$

where k controls the desired power flow. In summary, the current-controlled interface unit 202 in which the output current derives from the terminal voltage in the form Iref(s)=k G(s)V(s) provides simple, robust grid interaction. When the grid 206 is present, the low connection impedance assures that the output voltage of the interface unit 202 is nearly identical to the grid voltage. When the grid connection is lost, the effective high connection impedance means that V(s)=0 is the only valid solution, and the interface unit 202 quickly moves away from the nominal settings. This change is readily detected, followed by setting the output current to zero and disconnecting. The approach works without a synchronization process, and is a good match to modular power interface units, such as inverters. The primary requirement is that G(s) must not match the inverse of the effective load impedance—a condition that can be assured by choosing G(s) to include a time delay, to provide slow time variation of G(s), or other ensuring that the functional relation is not invertible.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A method for preventing islanding of a power source connected to an electric AC grid via an interface, the method comprising the steps of:
   sensing an output voltage waveform of the interface using a high-pass filter circuit connected to an output of the interface;
   generating a reference current waveform with the high-pass filter circuit, such that the reference current waveform is (i) proportional to the output voltage waveform and (ii) time delayed relative to the output voltage waveform;
   controlling an output current waveform of the interface to track the reference current waveform; and
   discontinuing said output current waveform when said output voltage waveform is sensed to be outside a predetermined waveform range.

2. The method of claim 1, wherein the interface (i) comprises a power inverter or another form of a switching power converter, and (ii) controls the output current waveform flowing from the power source into the grid based on the reference current waveform.

3. The method of claim 1, wherein said step of controlling said output current waveform comprises a step of tracking a maximum power point of the power source.

4. The method of claim 1, wherein said step of discontinuing said output current waveform comprises turning off the power source and/or turning off the interface.

5. The method of claim 1, wherein said step of discontinuing said output current waveform comprises disconnecting the power source from the AC electric grid.

6. The method of claim 1, wherein said step of discontinuing said output current waveform is performed after said output voltage waveform is sensed to be outside of said predetermined waveform range for a predetermined number of line cycles of operation.

7. The method of claim 1, wherein said step of sensing an output voltage waveform comprises sensing a frequency of said output voltage waveform.

8. The method of claim 1, wherein said predetermined waveform range of said sensed voltage waveform includes a predetermined nominal value.

9. The method of claim 1, wherein the power source comprises one or more sources.

10. A system for preventing islanding of a power source connected to an AC electric grid, comprising:
    an interface connectable between the power source and the electric grid;
    a sensor for sensing an output voltage waveform of said interface, the sensor comprising a high-pass filter circuit;
    a control unit for controlling an output current waveform of said interface to track a reference current waveform having a mathematical relationship with the sensed output voltage waveform such that the output current waveform is proportional to an output of the high-pass filter circuit; and
    a discontinuing unit for discontinuing said output current waveform when said output voltage waveform is sensed to be outside a predetermined waveform range.

11. The system of claim 10, wherein said step of discontinuing said output current waveform is performed after said output voltage waveform is sensed to be outside of said predetermined waveform range for a predetermined number of line cycles of operation.

12. The system of claim 10, wherein said mathematical relationship is a linear, nonlinear and/or non-invertible function of said sensed voltage waveform.

13. The system of claim 10, wherein said mathematical relationship includes a time delay.

14. The system of claim 10, wherein said mathematical relationship includes a small time variation.

15. A computer readable medium comprising instructions which when executed by a computer system causes the computer to implement a method for preventing islanding of a power source connected to an electric grid via an interface, the method comprising the steps of:
    sensing an output voltage waveform of the interface;
    controlling an output current waveform of the interface to track a reference current waveform having a mathematical relationship with the sensed output voltage waveform such that the output current waveform is (i) proportional to and (ii) time delayed relative to an output of a high-pass filter circuit connected to an output of the interface; and
    discontinuing said output current waveform when said output voltage is sensed to be outside a predetermined voltage range.

16. A system for preventing islanding of a power source connected to an electric grid via an interface, the system comprising:
    at least one processor programmed to (i) sense an output voltage of the interface and (ii) generate a reference current waveform that is proportional to a mathematical function of the output voltage, the mathematical function including a term proportion to the time derivative of the output voltage;
    at least one processor programmed to control an output current waveform of the interface to track a reference current waveform; and
    at least one processor programmed to discontinue said output current waveform when said output voltage waveform is sensed to be outside a predetermined waveform range.

17. The method of claim 1, wherein sensing an output voltage waveform of the interface using a high-pass filter circuit comprises sensing an output voltage waveform of the interface using a high-pass capacitor-resistor (CR) filter circuit.

18. The system of claim 10, wherein the high-pass filter circuit comprises a high-pass capacitor-resistor (CR) filter circuit.

19. The computer readable medium of claim 15, wherein the output current waveform is (i) proportional to and (ii) time delayed relative to an output of a high-pass capacitor-resistor (CR) filter circuit connected to an output of the interface.

* * * * *